United States Patent
Brady et al.

(10) Patent No.: US 6,889,602 B2
(45) Date of Patent: May 10, 2005

(54) GRILLING APPLIANCE

(75) Inventors: Martin Brady, Richmond, VA (US);
Xiaogang Guo, Greensburg, PA (US)

(73) Assignee: Hamilton Beach/Proctor-Silex, Inc., Glen Allen, VA (US)

(*) Notice: Subject to any disclaimer, the term of this patent is extended or adjusted under 35 U.S.C. 154(b) by 0 days.

(21) Appl. No.: 10/766,402

(22) Filed: Jan. 28, 2004

(65) Prior Publication Data

US 2004/0182252 A1 Sep. 23, 2004

Related U.S. Application Data

(63) Continuation of application No. 10/429,464, filed on May 5, 2003, now abandoned, which is a continuation of application No. 10/130,090, filed as application No. PCT/US00/25425 on Sep. 15, 2000, now abandoned.

(51) Int. Cl.[7] ................ A47J 37/00; A47J 37/04; A47J 37/06; A47J 37/08; A23L 1/00
(52) U.S. Cl. ................ 99/378; 99/372; 99/374; 99/376; 99/381
(58) Field of Search ............. 99/326–333, 339, 99/340, 349–351, 352–355, 372–382, 400, 401, 444–450, 422–425, 481, 482; 126/20, 41 R, 369; 219/521, 524, 525, 586, 401; 426/523

(56) References Cited

U.S. PATENT DOCUMENTS

| | | |
|---|---|---|
| 3,068,778 A | 12/1962 | Majerus |
| D194,336 S | 1/1963 | Cornwell |
| 3,172,999 A | 3/1965 | Sutton et al. |
| 3,848,110 A | 11/1974 | Giguere et al. |
| D240,993 S | 8/1976 | Levin |
| 3,998,145 A | 12/1976 | Maisch |
| 4,011,431 A | 3/1977 | Levin |
| D246,149 S | 10/1977 | Levin |
| 4,091,720 A | 5/1978 | Wheeler |
| 4,150,609 A | 4/1979 | McClean |
| 4,178,500 A | 12/1979 | Brindopke |
| 5,129,313 A | 7/1992 | Coppier |
| 5,255,595 A | 10/1993 | Higgins |
| 5,615,604 A | 4/1997 | Chenglin |
| 5,636,564 A | 6/1997 | Weiss |
| 5,848,567 A | 12/1998 | Chiang |
| 5,890,419 A | 4/1999 | Moravec |
| D409,876 S | 5/1999 | Gruaz |
| 6,012,380 A | 1/2000 | Hermansson |
| 6,170,389 B1 | 1/2001 | Brady |
| 6,257,126 B1 | 7/2001 | Veljkovic et al. |
| 6,269,738 B1 | 8/2001 | Huang |
| 6,276,263 B1 | 8/2001 | Huang |
| 6,389,959 B1 | 5/2002 | Robertson |
| 6,782,804 B1 * | 8/2004 | Lin ..................... 99/349 |

FOREIGN PATENT DOCUMENTS

DE          321814          7/1957

* cited by examiner

Primary Examiner—Timothy F. Simone
(74) Attorney, Agent, or Firm—Roger S. Dybvig

(57) ABSTRACT

A portable electric grilling appliance (20) for household use which has first and second heating units (22, 24) which, in use, overlie one another has substantially identical housing shells to make it evident to the user that the grilling appliance (20) can be used with either one of the heating units as the lower heating unit and provide support for the other heating unit. The two heating units (22, 24) have substantially the same exterior appearance and both are designed to function as either the top heating unit or the bottom heating unit. The two heating units (22, 24) are substantially symmetrical about a horizontal plane extending between them when the heating units are arranged one on top of the other to indicate to the user of the appliance that either heating unit could be placed on top and the other on the bottom.

15 Claims, 5 Drawing Sheets

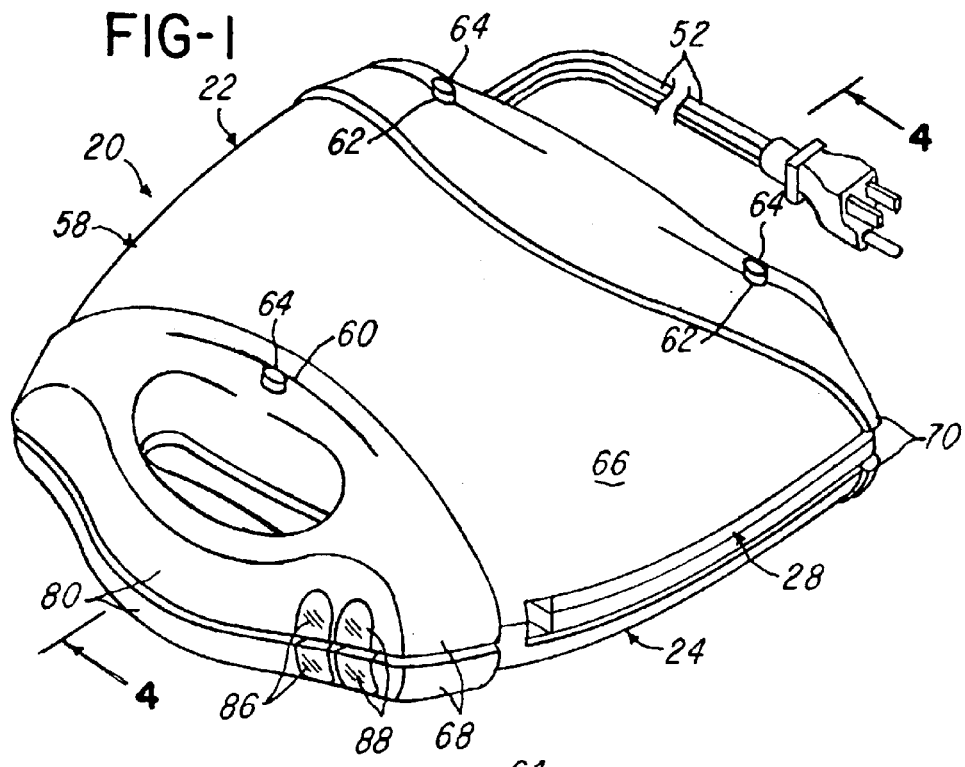
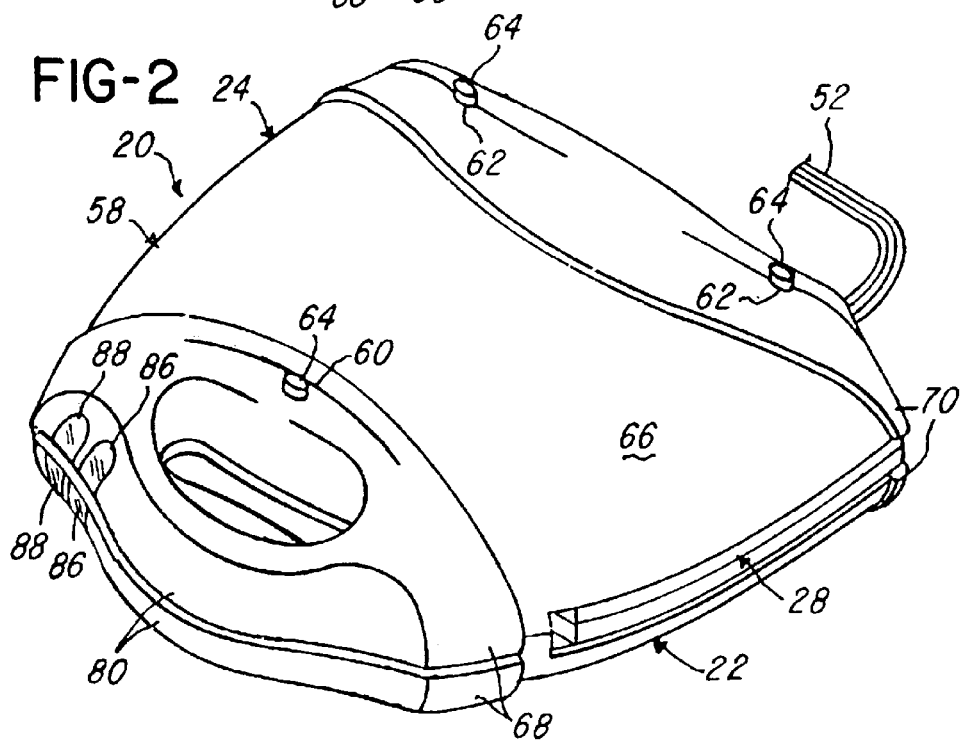

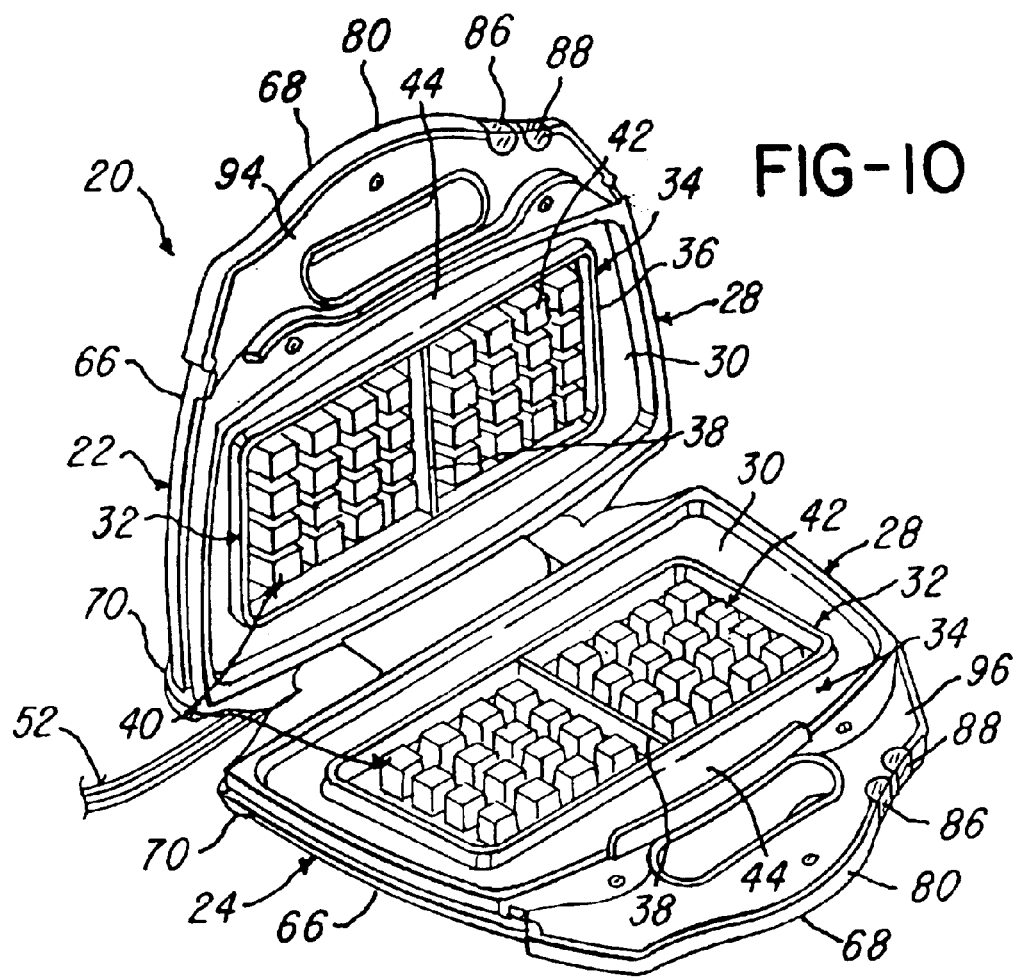
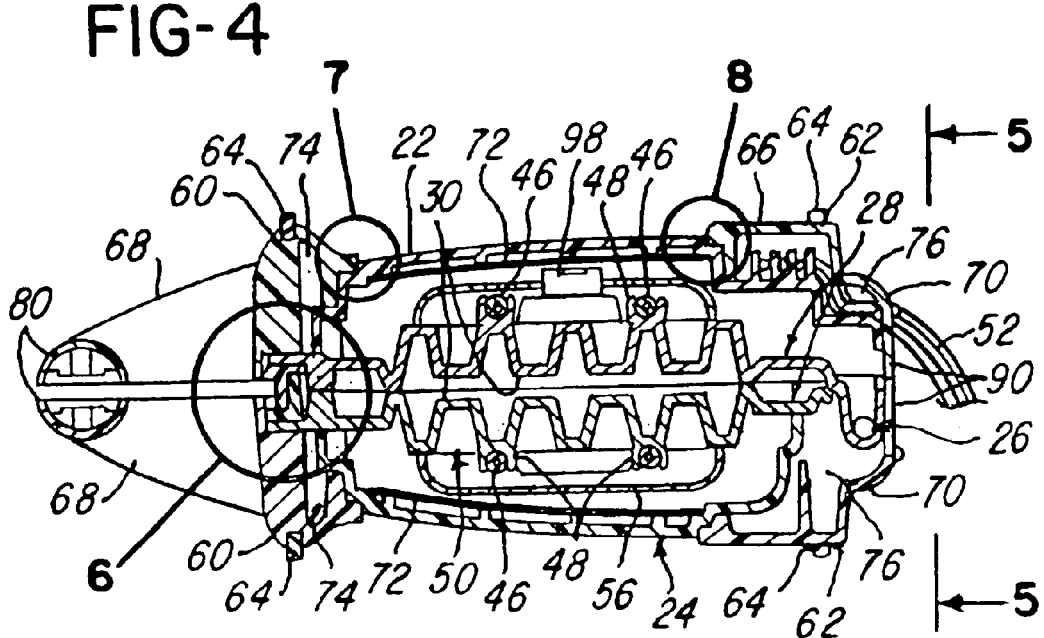

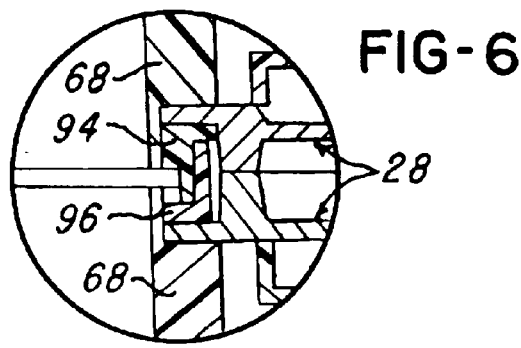
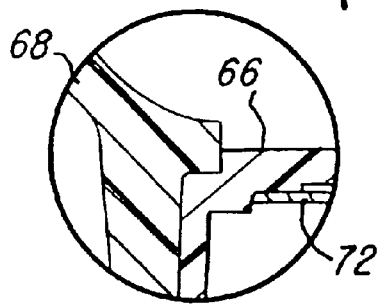
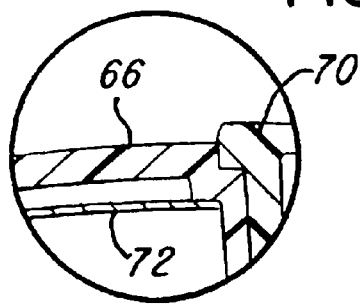
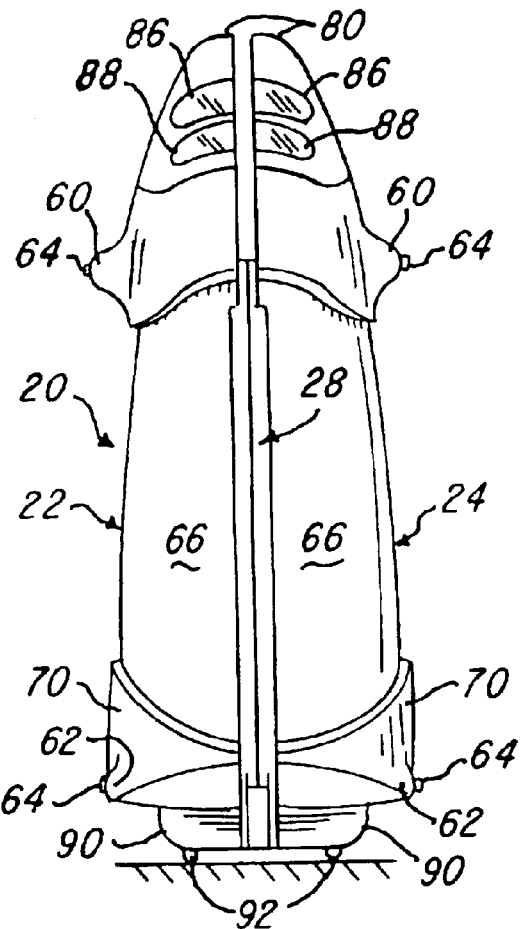
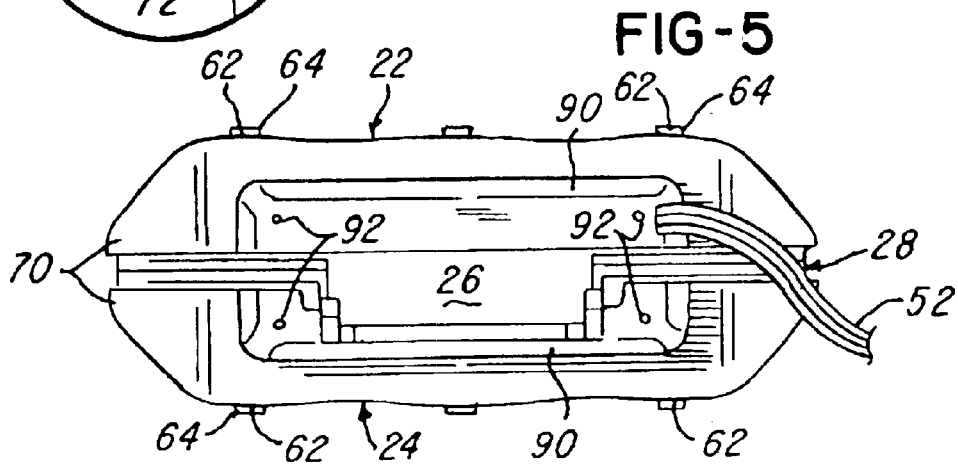

GRILLING APPLIANCE

CROSS-REFERENCE TO RELATED APPLICATION

This application is a continuation of application Ser. No. 10/429,464, filed May 5, 2003, now abandoned which is a continuation of application Ser. No. 10/130,090, filed Oct. 1, 2002, now abandoned a national phase patent application of International application PCT/US00/25425, filed Sep. 15, 2000.

FIELD OF THE INVENTION

This invention relates to a grilling appliance and particularly to a portable electric grilling appliance for household use. More precisely, this invention relates to an electric household grilling appliance having two heating units provided with grill plates which, in use, lie one over the other and form between them a grilling chamber. The two heating units are pivotally connected to one another by a hinge that connects a back edge of both heating units. To open the grilling chamber, a handle attached to the uppermost heating chamber can be raised to pivot the uppermost heating chamber about the hinge, thereby separating all but the hinged back edges of the heating units from one another. The grilling appliance of this invention is primarily intended for use as a waffle maker, in which case the grill plates have mutually confronting front surfaces formed as waffle shaping grids. However, as will become apparent, this invention could be useful for other grilling appliances.

BACKGROUND OF THE INVENTION

Various portable electric grilling appliances, including waffle makers, of the general type described above have been marketed for many years. In addition, commercial waffle makers have been available which have two heating units mounted on a stanchion or base. These have an upper heating unit and a lower heating unit. A handle attached to the upper heating unit is raised to open the grilling chamber in order to pour a batter onto the lower grill. Thereafter, the grilling chamber is closed and the two heating units are rotated to invert the two heating units.

A portable household waffle maker has also been advertised which is constructed so that it can be turned upside down during use to spread waffle batter onto both grill elates thereof.

Grilling appliances, when used, occupy a significant area of counter space because of their relatively large square area or "footprint." The relatively large area can present a storage problem and it has been recognized that such appliances can advantageously occupy less storage space if stored on an edge in a vertical rather than in a horizontal orientation. However, when a typical grilling appliance that has two relatively pivotal heating units is placed on an edge, the two heating units tend to fall away from one another and at least one of them typically falls to a generally horizontal position. Various clamping systems have been suggested and used to clamp together the two heating units of a grilling appliance having two heating units so that the heating appliance can be stored on an edge. Such clamping systems may be useful but add to the cost of manufacturing a heating appliance and, if separate from the heating appliance, are easily misplaced and can become a source of irritation to the purchaser of the heating appliance.

SUMMARY OF THE INVENTION

One object of this invention is to provide an improved portable electric grilling appliance for household use which has first and second heating units which, in use, overlie one another.

Another object of this invention is to provide such an improved portable electric grilling appliance with substantially identical housing shells to make it evident to the user that the grilling appliance can be used with either one of the heating units functioning as the lower heating unit and providing support for the other heating unit.

Yet another object of this invention is to provide an improved portable electric grilling appliance for household use which has first and second heating units which, in use, overlie one another, the exterior portions of the two heating units being substantially symmetrical about an imaginary plane extending between the two heating units when supported one on top of the other.

Still another object of this invention is to provide an improved portable electric grilling appliance for household use which has first and second heating units which, in use, overlie one another and which can be stood upright for storage on rearward faces of the heating units without the need for clamps or the like for holding the two heating units upright.

A grilling appliance in accordance with this invention comprises two heating units which are hinged together so that one of the heating units can overlie the other heating unit to provide a grilling chamber. The two heating units have substantially the same exterior appearance and both are designed to function as either the top heating unit or the bottom heating unit. In one aspect of this invention, the two heating units are substantially symmetrical about a horizontal plane extending between them when the heating units are arranged one on top of the other. The user of the appliance is induced thereby to realize that either heating unit could be placed on top and other on the bottom.

In another aspect of this invention, the two heating units are provided with plural feet, which may or may not include anti-slip foot pads, that project outwardly from the outer shell of each heating appliance. This provides another visual indication to the user that either one of the two heating units could be on the bottom and the other on the top.

In another aspect of this invention, the two heating units of a grilling appliance are each provided with a pair of projections that extend outwardly from the rearward edges of the two heating units. The projections are so located on the heating units that, when the grilling appliance is placed in a vertical orientation so that it is supported by such projections, the center of gravity of each of the heating units is located between the projections on one of the heating units and the projections on the other heating unit. Therefore, the heating units tend to pivot toward one another about the imaginary line extending through the points of engagement of their respective pair of projections. Accordingly, the two heating units tend to remain upright and not fall away from one another. Because of this construction, the grilling appliance may readily and safely be stored in a vertical orientation.

Other objects, advantages and features of this invention will become apparent from the following description and the drawings

BRIEF DESCRIPTION OF THE DRAWINGS

FIG. 1 is a perspective view of a waffle maker in accordance with this invention as viewed generally from the front, above and the right and showing one orientation of the waffle maker. The power cord for the waffle maker is shown broken or fragmented in several of the drawing figures.

FIG. 2 is a perspective view of the waffle maker of FIG. 1 as viewed generally from the front, above and the right, but with the waffle maker inverted so that it is oriented upside down from the orientation shown in FIG. 1.

FIG. 4 is a cross-section view of the waffle maker taken on line 4—4 of FIG. 1.

FIG. 5 is a rear elevational view of the waffle maker indicated by arrows 5—5 of FIG. 4.

FIG. 6 is an enlarged cross-sectional view of the portion of the waffle maker enclosed within the view circle 6 of FIG. 4.

FIG. 7 is an enlarged cross-sectional view of the portion of the waffle maker enclosed within the view circle 7 of FIG. 4.

FIG. 8 is an enlarged cross-sectional view of the portion of the waffle maker enclosed within the view circle 8 of FIG. 4.

FIG. 10 is a perspective view showing the waffle maker of FIG. 1 open as it would to pour batter into the waffle maker or to remove a cooked waffle (not shown) from the waffle maker.

FIG. 11 is a side elevational view showing the waffle maker of FIG. 1 stored on a counter top

DETAILED DESCRIPTION

Figure 3:
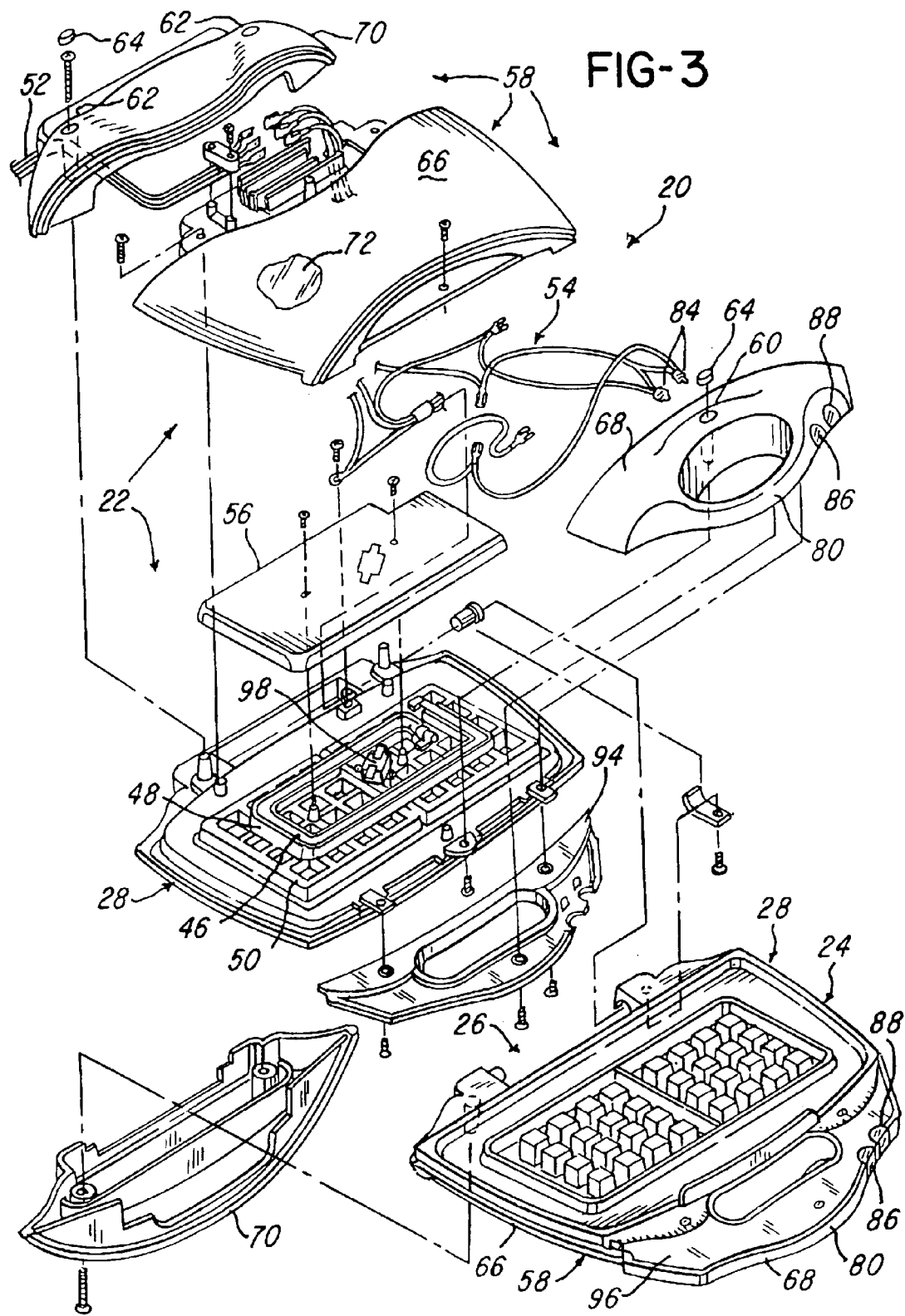
FIG. 3 is a fragmented, partly exploded perspective view of the waffle maker of FIG. 1.
Figure 9:
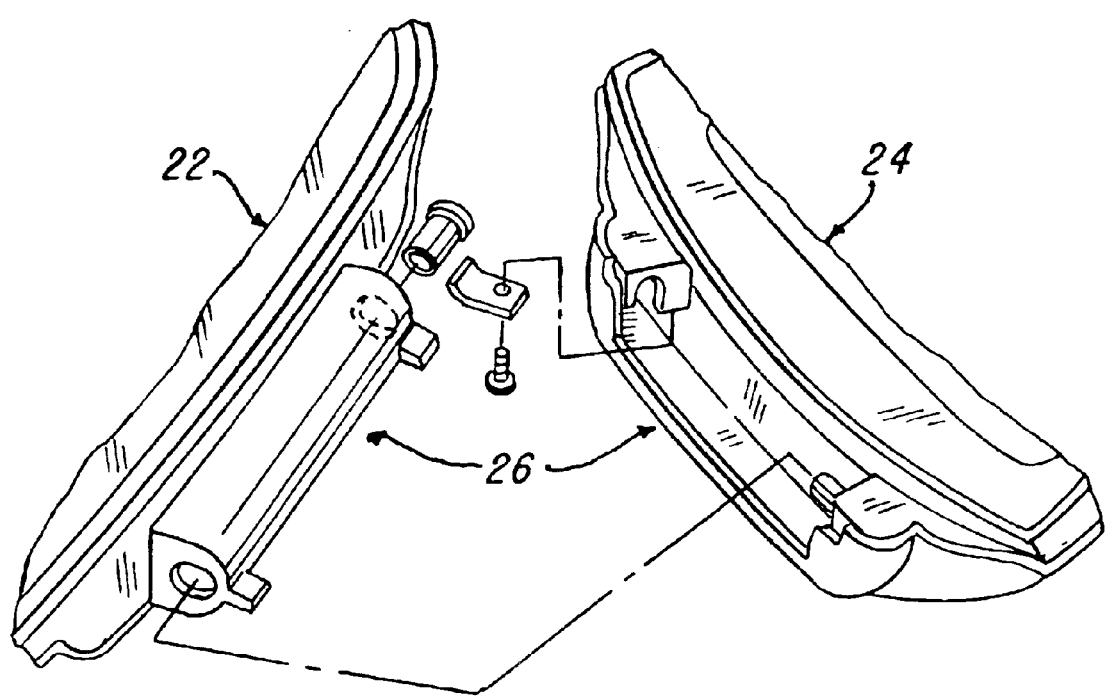
FIG. 9 is a fragmentary, partly exploded perspective illustrating parts of the hinge that connects the two heating units together.

With reference to FIGS. 1, 2 and 3, this invention is illustrated embodied in a waffle maker 20 which includes a first heating unit 22, a second heating unit 24, and a hinge 26 interconnecting the first and second heating units 22 and 24 together for rotation relative to one another about a hinge axis extending transversely along the rear of the two heating units 22 and 24.

With reference also to FIGS. 4 and 10, each heating unit 22 and 24 comprises a cast metal grill plate 28 having a front surface 30 that forms a grid 32 including a waffle-grilling and waffle-shaping center section 34 bounded by a peripheral wall 36 and divided by a center wall 38 into two waffle-grilling parts 40 and 42. Grid 32 also includes a relatively deep and wide peripheral trough 44 extending around the outside of the center section for waffle batter which spills over from the center section 34.

The grill plate 28 is heated by a calrod heater 46 lodged in an elongate, generally rectangular groove 48 on the back surface 50 of the grill plate 28, and supplied with household current by a power cord 52 and a wiring harness 54, in a manner conventional in the art.

A sheet metal heat shield 56 overlies the calrod heater 46 to limit the transmission of heat from the heater 46 away from the back of the grill plate 28. A housing shell, generally designated 58, affixed to the grill plate 28, overlies the back of the grill plate 28, the calrod heater 46, and the heat shield 56. A set of three feet, namely a front foot 60 and a pair of rear feet 62, are formed on the each housing shell 58 to provide a three point or tripod support for both heating units 22 and 24, regardless of which heating unit 22 or 24 overlies the other heating unit 22 or 24. The apexes of the feet 60 and 62 on each respective heating unit 22 and 24 are mutually coplanar so that, when the feet 60 and 62 are engaged with a horizontal support surface, such as a kitchen counter top, the lower heating unit 22 or 24 will be supported by its feet 60 and 62 in a horizontal orientation. The feet 60 and 62 are shown provided with small rubber or rubber-like foot pads 64 that frictionally resist any sliding motion along a support surface. Provision of the foot pads 64 is optional. The housing shell material forming the feet 60 and 62 could be a rubber or rubber-like friction producing material, in which event the foot pads 64 would be unnecessary.

As shown best in FIG. 3, each housing shell 58 comprises a center panel 66, a front panel 68, and a rear panel 70. These panels may each comprise a painted phenolic or other suitable heat-resistant material. Optionally, the center panel 66 could be made from a phenolic material and the front and rear panels 68 and 70 made from a rubber material, such as Santoprene. In the latter event, the foot pads 64 would not be needed.

Each center panel 66 preferably has a heat insulating reflective foil lining 72 which, in addition to the heat shield 56, maintains the temperature of the center panel reasonably low. The front and rear panels 68 and 70 have surfaces which overlap the center panel 66, as is evident from an inspection of FIGS. 4 and 6 through 8. Because of the overlapping relationship, and also because the front and rear panels 68 and 70 have air gaps, indicated at 74 and 76 in FIG. 4, separating significant parts of them from the grill plates 28, the front and rear panels 68 and 70 remain relatively cool to the touch when the waffle maker 20 is in use.

The front foot 60 of each heating unit 22 and 24 is formed by the front panel 68 thereof and extends outwardly from the rest of the front panel 68. Similarly, the rear feet 62 are formed by the rear panels 70 and extend outwardly from the rest of the rear panels 70 of each heating unit 22 and 24. Because the front panels 68 and the rear panels 70 remain cool to the touch during use of the waffle maker 20, the feet 60 and 62 remain cool during use of the waffle maker 20 so that either set of feet 60 and 62 could rest on a kitchen counter without concern for excessively heating the counter.

The front panels 68 are formed with loop handles 80 for carrying the waffle maker. In addition, the handles 80 can be used to turn the waffle maker 20 upside down after pouring a waffle batter into the grilling chamber 82 formed by and between the two grill plates 28. In use the waffle maker 20 is preheated to a desired operating temperature, and then opened, as shown in FIG. 10, so that a waffle batter can be poured onto the lower grill plate 28. The waffle maker 20 is then closed and shortly thereafter turned upside down to better spread the batter along both grill plates 28.

Lamp bulbs, such as small neon lamps, 84 can be located behind differently tinted lenses 86 and 88 located in the front panels for indicating operating conditions of the appliance 24. As an example, the lenses 86 could be tinted red and the lamp or lamps 84 behind the lenses 86 could indicate that the waffle maker 24 is plugged into house current. The lenses 88 could be tinted green and the lamp or lamps 84 behind the lenses 88 could indicate that a predetermined temperature has been reached so the batter can be poured onto the lower grilling plate 28 and the grilling process started.

In keeping with the symmetrical design of the exterior of the waffle maker 20, the lenses on the respective heating units 22 and 24 are mutually aligned, as evident from the drawings. It may be noted that, due to the alignment of the two sets of lenses 86 and 88, it is only necessary to use one lamp 84 behind one of the lenses 86 because the light from that lamp 84 will also shine through the other lens 86. Similarly, only one lamp 84 would necessarily be used to illuminate both lenses 88. Of course, brighter signals could be obtained by having a lamp 84 behind each of the four lenses 86 and 88.

Further in accordance with this invention, the waffle maker 20 may be stored in an upright orientation as viewed in FIG. 11. To overcome the tendency for one or both of the heating units 22 and 24 to pivot to an open position when they are upright, the rear walls, designated 90, of the heating units 22 and 24 are each provided with two small, rearwardly-extending projections 92 spaced apart such that the major portion of the weight of the two heating units 22 and 24 is located between the projections 92 on the heating unit 22 and the projections 92 on the heating unit 24. With this construction, the heating units 22 and 24 have a natural tendency to pivot toward one another about imaginary lines passing through the respective pairs of projections 92 on the two heating units 22 and 24 so that they tend remain erect in the upright orientation thereof shown in FIG. 11.

It will be observed from the drawings that the two heating units 22 and 24 are substantially symmetrical about the imaginary horizontal plane between their respective grill plates 28, when the heating units 22 and 24 with one overlying the other, as shown in FIGS. 1, 2 and 4. In fact, the two heating units 22 and 24 are so symmetrical on their outer surfaces on there respective top (or bottom) faces, their front faces, and their side faces. As shown best in FIG. 5, their respective rear walls 90 are not completely symmetrical because of differences between them in regard to the portions of the grill plates 28 that form the hinge 26. The rear walls 90 are relatively insignificant because mostly out of view so that, from the standpoint of the user of the waffle maker 20, the symmetry is complete. As also evident in the drawings, the formation of feet 60 and 62 on the front are rear panels is such that the feet 60 and 62 on both heating units 38 have the same appearance. When the heating units 22 and 24 are arranged one above the other as shown in FIGS. 1, 2, 4 and 5, the two front feet 60 are coaxial or vertically aligned with one another. Similarly, each rear foot 62 of the heating unit 22 is coaxial or aligned with a rear foot 62 of the heating unit 24.

The drawings show one mode of constructing the two heating units 22 and 24 and the hinge 26. Those familiar with the art will be aware that other modes of construction may be used without departing from the present invention. An aspect of the grilling appliance 20 not mentioned above is the provision of finish plates 94 and 96 which cover concave parts of the front panels 68 so that batter is prevented from entering into the concave parts and so that the appliance will be easier to clean. The finish plates 94 and 96 preferably have baffles which prevent steam from exiting into the handle area of the front panels 68.

The electric circuit for controlling the operation of the waffle maker 20 can be entirely conventional, with parts of the wiring harness 54 going through part of the hinge 26, as is conventional, for supplying power to the heaters 46 associated with both grill plates 28. The "ready" light provided by the lamp or lamps 84 associated with the green-tinted lenses 88 can be controlled by a thermostat 98 on the back side of one of the grill plates 28.

While the invention has been particularly shown and described with reference to the preferred embodiments thereof, it will be understood by those skilled in the art that various alterations in form and detail may be made therein without departing from the spirit and scope of the invention.

We claim:

1. A portable grilling appliance comprising:
a first heating unit comprising a first grill plate having a front surface and a back surface, a first electrically-operated heater for heating said first grill plate, and a first housing shell covering said back surface of said first grill plate and said first heater, said first housing shell having a first set of at least three feet for supporting said first heating unit in a generally horizontal orientation when said feet are placed on a horizontal support surface, such as a kitchen counter top; and
a second heating unit hinged to said first heating unit and comprising a second grill plate having a front surface and a back surface, a second electrically-operated heater for heating said second grill plate, and a second housing shell covering said back surface of said second grill plate and said second heater, said second housing shell having a second set of feet equal to the number of feet in said first set of feet, said second set of feet supporting said second heating unit in a generally horizontal orientation when said second set of feet are placed on a horizontal support surface, such as a kitchen counter top.

2. The grilling appliance of claim 1 wherein said second set of feet have the same shape as said first set of feet.

3. The appliance of claim 1 wherein said both said first grill plate and said second grill plate have grids for grilling and shaping waffles.

4. The grilling appliance of claim 1 wherein said second set of feet are located on said second shell in the same position said first set of feet have on said first shell.

5. A portable grilling appliance comprising:
a first heating unit comprising a first grill plate having a front surface and a back surface, a first electrically-operated heater for heating said first grill plate, and a first housing shell covering said back surface of said first grill plate and said first heater, said first housing shell having a rear wall and a pair of projections extending from said rear wall for supporting said first heating unit in an upright orientation;
a second heating unit and comprising a second grill plate having a front surface and a back surface, a second electrically-operated heater for heating said second grill plate, and a second housing shell covering said back surface of said second grill plate and said second heater, said second housing shell having a rear wall and a pair of projections extending from said rear wall for supporting said second heating unit in an upright orientation; and
a hinge connecting said first heating unit to said second heating unit.

6. A portable waffle maker comprising:
a first heating unit comprising a first grill having a front side provided with a first grid for shaping waffles, a first housing covering the sides and back of the grill, a first electric heater located between the first grill and the first housing for heating the first grill, and a first set of feet on said first housing for supporting said first heating unit;
a second heating unit comprising a second grill having a front side provided with a second grid for shaping waffles, a second housing covering the sides and back of the second grill, a second electric heater located between the second grill and the second housing for heating the second grill, and a second set of feet on said second housing for supporting said second heating unit; and
a hinge connecting said first heating unit to said second heating unit so that either one of said heating units can overlie the other of said heating units, said housings of said heating units having substantially the same external appearance.

7. The waffle maker of claim 6 wherein each of said housings has a rear wall and a pair of projections extending from said rear wall for supporting said heating units in an upright orientation.

8. The waffle maker of claim 7 wherein said projections are so located on said housings that said heating units have a natural tendency to pivot toward one another when they are supported in an upright position facing one-another.

9. The waffle maker of claim 6 wherein said two heating units are substantially symmetrical about a horizontal plane extending between them when said heating units are arranged one on top of the other.

10. The waffle maker of claim 9 wherein each of said housings has a rear wall and a pair of projections extending from said rear wall for supporting said heating units in an upright orientation.

11. The waffle maker of claim 10 wherein said projections are so located on said housings that said heating units have a natural tendency to pivot toward one another when they are supported in an upright position facing one-another.

12. The waffle maker of claim 9 wherein said first set of feet comprises three feet at three respectively different locations and positioned for supporting said first housing in a horizontal orientation and said second set of feet comprise three different feet at three respectively different locations which correspond to the locations of said first set of feet on said first housing.

13. The waffle maker of claim 12 wherein each of said housings has a rear wall and a pair of projections extending from said rear wall for supporting said heating units in an upright orientation.

14. The waffle maker of claim 13 wherein said projections are so located on said housings that said heating units have a natural tendency to pivot toward one another when they are supported in an upright position facing one-another.

15. The waffle maker of claim 5 wherein said projections are so located on said housings that said heating units have a natural tendency to pivot toward one another when they are supported in an upright position facing one-another.

* * * * *